Patented Dec. 2, 1941

2,265,119

UNITED STATES PATENT OFFICE 2,265,119

POLYAMIDE

Cole Coolidge, Wilmington, Del., assignor to E. I. du Pont de Nemours & Company, Wilmington, Del., a corporation of Delaware No Drawing. Application June 12, 1939, Serial No. 278,760

9 Claims. (Cl. 18—48)

The invention herein described relates to synthetic linear polyamides and more particularly to a method for plasticizing them.

An object of this invention is to provide a novel and simple process for incorporating plasticizers and modifying agents in synthetic linear polyamides. A further object is to provide a method for the preparation of new plastic compositions useful in making filaments, bristles, ribbons, films, sheets, rods, tubes, and the like. A still further object is to provide a method for improving the properties, particularly the pliability, of synthetic linear polyamides and of articles derived therefrom. Other objects will appear hereinafter.

These objects are accomplished, as more particularly described in the following description, by immersing the synthetic linear polyamide, preferably in the form of a sheet or film, in a solution of the plasticizer in a non-solvent for the polyamide.

I have found that the polyamides with which this invention is concerned may be successfully plasticized by immersion of the polyamide in a solution of the plasticizing agent and that the manner in which the plasticizer is absorbed is quite different than is the case when the same method of treatment is applied to materials other than the polyamides. Unlike such other materials, when the polyamide is immersed in a solution of a suitable plasticizer a selective absorption of the plasticizer from the solution takes place as evidenced by the fact that the concentration of the plasticizer within the polyamide can be made to exceed the concentration of plasticizer in the bath. The ratio of plasticizer to solvent in the film as it emerges from the bath is much higher than the ratio of plasticizer to solvent in the treatment bath.

The polyamides used in the practice of this invention are of the general types described in Patents 2,071,250, 2,071,253 and 2,130,948. It is therefore to be understood that the expression, "synthetic linear polyamides," as used hereinafter, designates the said general types.

A characteristic property of these polymers is that they can be formed into filaments which can be cold drawn into fibers showing molecular orientation along the fiber axis. The polyamides are particularly useful for the preparation of fibers, bristles, ribbons, sheets, rods, tubes, and the like. The polyamides are of two types, those obtainable from polymerizable monoaminomonocarboxylic acids and their amide-forming derivatives, e. g. caprolactam, and those obtainable from the reaction of suitable diamines and suitable dicarboxylic acids or amide-forming derivatives of dibasic carboxylic acids. In these polyamides the amide groups form an integral part of the main chain of atoms in the polymer. On hydrolysis with strong mineral acids, the polyamides revert to monomeric polyamide-forming reactants.

Although the synthetic linear polyamides as a class are microcrystalline and have fairly sharp melting points, they can be formed into many useful objects without the use of solvents or plasticizers. This is accomplished by spinning, extruding, or otherwise forming the object from the molten polyamide. To improve the properties of the product thus formed, it is generally desirable to subject them to a process of cold drawing (application of tensile stress) or to a process of cold working, e. g. cold rolling (application of compressive stress) or by subjecting them to both cold drawing and cold working. The products thus formed are unusually strong, have high melting points, and for many purposes are sufficiently pliable. For certain uses, however, and particularly for use in the form of films, sheets, and the like, greater pliability is sometimes desired. For this purpose the present invention provides a method which is peculiarly effective for obtaining the desired pliability.

The present method of introducing plasticizer into polyamides, which involves absorption of the plasticizer from solution, is particularly effective when the plasticizing agent is a carboxylic acid, phenol or sulfonamide. These agents are all selectively absorbed to a high degree by polyamides. This high affinity of polyamides for these plasticizers is probably associated with the acidic character of these plasticizers. That these plasticizers are acidic is apparent from the fact that they contain a hydrogen atom replaceable by sodium. The method can, however, be used to introduce plasticizers which are not selectively absorbed by the polyamides. In general, however, such plasticizers are more conveniently or economically introduced by other methods.

In the best method of carrying out the invention a substantially saturated solution of the plasticizer in low concentration is used. By proper choice of solvents, it is a simple matter to obtain saturated solutions of comparatively low concentration. For example, plasticizers soluble in alcohol but insoluble in water may be dissolved in the former and the solution diluted with water until the first trace of precipitation occurs, thus yielding a saturated solution in aqueous alcohol.

After the desired amount of plasticizer has been absorbed by the polyamide, the film is removed and dried. The rate of absorption is increased by increased bath temperatures but in general the final concentration of plasticizer in the film is not a function of the temperature. The process is applicable to polyamides in both the oriented and unoriented state.

This invention is described in more detail in the following examples in which parts are by weight.

Example I

A transparent sheet of 0.003" thickness prepared from polyhexamethylene adipamide (polymer derived from hexamethylene-diamine and adipic acid) having an intrinsic viscosity of about 1.0 was immersed in a saturated aqueous alcohol solution of amylbenzenesulfonamide (30 parts of amylbenzenesulfonamide, 170 parts of ethyl alcohol, and 390 parts of water) maintained at 75° C. The sheet was allowed to remain in the solution for three hours, removed, rinsed twice with 95% aqueous alcohol, wiped free from surface solvent and immediately weighed. The sheet showed an increase in weight of 31.4%. After removing the solvent by drying to constant weight at 100° C., the film showed an increase in weight of 14.9% over the original unmodified film. As calculated by difference (31.4—14.9) the film contained 16.5% solvent when first removed from the plasticizing bath, or a ratio of plasticizer to solvent of 14.9:16.5 (almost 1:1), while the plasticizing bath contained plasticizer and solvent in a ratio of 1:19, indicating that the plasticizer was selectively absorbed from the bath. When the sheet was allowed to remain in contact with air (50% relative humidity) for several hours, it absorbed about 2% moisture. The sheet thus plasticized was more pliable and had a softer feel than either the original unplasticized sheet (conditioned at 50% relative humidity) or the sheet containing just the amylbenzenesulfonamide (bone dry).

Example II

A transparent sheet 0.005" thick of polyhexamethylene adipamide having an intrinsic viscosity of 1.0 was immersed in a saturated aqueous alcohol solution of sebacic acid (10 parts of sebacic acid, 200 parts of water, and 5 parts of ethanol) (4.8% solids) maintained at 75° C. The sheet was allowed to remain in the solution for three hours, removed, rinsed twice with 95% aqueous alcohol, wiped free from surface liquid, and immediately weighed. The sheet showed an increase in weight of 26.2%. After removing the solvent by drying to constant weight at 100° C., the film showed an increase in weight of 13.7% over the original unmodified film. As calculated by difference (26.2—13.7) the film contained 12.5% solvent when first removed from the plasticizing bath, or a ratio of plasticizer to solvent of 13.7 to 12.5 (better than 1:1), while the plasticizing bath contained plasticizer and solvent in a ratio of about 1:21, indicating that the plasticizer was selectively absorbed from the bath. When the sheet was allowed to remain in contact with air (50% relative humidity) for several hours, it absorbed about 2% moisture. The sheet thus plasticized was more pliable and had a softer feel than either the original unplasticized sheet (conditioned at 50% relative humidity) or the sheet containing just the sebacic acid (bone dry).

Example III

A ribbon of polyhexamethylene adipamide was prepared by extruding the molten polymer between rollers immersed in cold water. A sample of this ribbon was immersed in a solution containing 10 parts of N-ethyl-p-toluenesulfonamide and 110 parts of 50% aqueous alcohol, maintained at 70°–75° C. After three hours, the strip was removed from the solution, rinsed twice with 50% aqueous alcohol, and dried to constant weight in a desiccator over calcium chloride. The sample, which showed an increase in weight of 9%, was more pliable than the original. When allowed to remain in air for several hours, the sample absorbed approximately 2% of its weight of moisture. The ribbon containing the sulfonamide and the water was much more pliable than either the unplasticized ribbon or the ribbon containing only the sulfonamide. The tensile strength of the plasticized sample after conditioning for forty-eight hours at 50% relative humidity and 25° C. was 7600 lbs./sq. in. as compared to 9500 lbs./sq. in. for the original ribbon. On cold rolling 100% by passing several times between the rolls of a hand mill, bringing the rolls closer together after each pass, the tensile strength was increased to 18,800 lbs./sq. in. as compared to 15,800 lbs./sq. in. for a similarly rolled sample of the unplasticized ribbon.

Example IV

A transparent sheet 0.005" thick of polyhexamethylene adipamide having an intrinsic viscosity of 1.0 was immersed in a saturated aqueous alcohol solution of tertiary amylphenol (5 parts tertiary amylphenol, 200 parts water, and 105 parts ethanol) (corresponding to 1.6% solids) maintained at 75° C. The sheet was allowed to remain in the solution for three hours, removed, rinsed twice with 95% aqueous alcohol, wiped free from surface liquid, and immediately weighed. The sheet showed an increase in weight of 21%. After removing the solvent by drying to constant weight at 100° C., the film showed an increase in weight of 11.0% over the original unmodified film. As calculated by difference (21—11.0) the film contained 10% solvent when first removed from the plasticizer bath, or a ratio of plasticizer to solvent of 11.0 to 10 (better than 1:1), while the plasticizing bath contained plasticizer and solvent in a ratio of about 1:60, indicating that the plasticizer was selectively absorbed from the bath. When the sheet was allowed to remain in contact with air (50% relative humidity) for several hours, it absorbed about 1.6% moisture. The sheet thus plasticized was more pliable and had a softer feel than either the original unplasticized sheet (conditioned at 50% relative humidity) or the sheet containing just the amylphenol (bone dry).

The aforementioned examples are merely illustrative of the process of this invention. As examples of additional synthetic linear polyamides to which the present invention is applicable there may be mentioned polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, polyxylylene sebacamide, polyhexamethylene phenylenediacetamide, and the polyamide derived from 3,3'-diaminodipropyl ether and adipic acid. Polymerized 6-aminocaproic acid, polymerized 9-aminononanoic acid, and polymerized 11-aminoundecanoic acid are additional examples of polyamides which may be used. The invention is also applicable to mixtures of polyamides and to interpolyamides. Examples of such interpolyamides are those obtained from hexamethylenediamine, decamethylenediamine, adipic acid, and sebacic acid and from hexamethylenediamine, adipic acid and caprolactam. In general, the synthetic linear polyamides do not possess fiber-forming properties unless they have an intrinsic viscosity above 0.4. Likewise, to be useful in making films, ribbons, tubes, rods, etc., the polyamide should have an intrinsic viscosity above 0.4 and preferably above 0.6.

Instead of the polyamides mentioned above which are obtainable from bifunctional polyamide-forming reactants, as essentially sole reactants, I may use the linear polymers obtained by including with the polyamide-forming reactants used to prepare the polyamide, other bifunctional reactants such as glycols and hydroxy acids. Examples of such modified polyamides are those derived from diamines, dibasic acids and glycols; those derived from amino acids, dibasic acids and glycols; and those derived from amino acids and hydroxy acids. Although these products contain ester linkages, they can still be referred to as polyamides, since they contain a plurality of amide linkages and retain many of the desirable properties of the simple polyamides. Like the simple polyamides these modified polyamides do not in general exhibit fiber-forming properties until their intrinsic viscosity is at least 0.4.

As additional examples of plasticizers or modifying agents which are particularly suited to incorporation into synthetic linear polyamides by the process of this invention may be mentioned acids such as succinic, glutaric, alpha-methyladipic, beta-methyladipic, diglycolic, hydroxybutyric, stearic, palmitic, tetrahydrofuroic, hydroxyvaleric, glyceric, benzoic, o-benzoylbenzoic, diphenic, abietic, camphoric, bis-sulfondiacetic, and drying oil acids. Also well adapted to the process of this invention are sulfonamides such as p-toluenesulfonamide, N-ethyl-p-toluenesulfonamide, mixtures of N-butyl-o- and -p-toluenesulfonamides, N-dibutyl -p - toluenesulfonamide, N-benzoyl-p-toluenesulfonamide, propylbenzenesulfonamide, N-ethyl-p-proplybenzenesulfonamide, amylbenzene sulfonamide, N-ethyl-p-amylbenzenesulfonamide, N-diethyl-p-amylbenzenesulfonamide, decylbenzenesulfonamide, cyclohexanesulfonamide, cyclohexane-1,4-disulfonamide, N-isobutylcyclohexanesulfonamide, N-phenylcyclohexanesulfonamide, N - dimethylcyclohexanesulfonamide, N - ethylbenzenesulfonamide, naphthalenesulfonamide, and N-ethylnaphthalenesulfonamide. As examples of phenols which are particularly adapted to the process may be mentioned resorcinol, hexylphenol, octylcatechol, o- and p-phenylphenols, secondary hexyl-2-chloro-4-hydroxytoluene, cyclohexylphenol, amylphenol, diamylphenol, hexylresorcinol, octyl-beta-naphthol, beta-naphthol, hydroquinone, salicylic acid, salicylic acid esters, phenolphthalein, o-hydroxydiphenyl and diphenylolpropane. As examples of plasticizers which may be incorporated in polyamides by the process of this invention, though less advantageously than the three classes of plasticizers noted above, may be mentioned dimethyl phthalate, dibutyl phthalate, dimethyl sebacate, dimethyl adipate, tricresyl phosphate, dibutyl phosphate, ethyl palmitate, aluminum palmitate, aluminum stearate, hexamethylene diacetamide, chlorinated hydrocarbons, chlorinated ethers, and cyclic ketones. The most effective plasticizers have boiling points above 200° C., and preferably above 250° C.

Although it is generally advantageous to apply the process of this invention to the polyamides while in the form of sheets, the invention can also be applied to the polyamides in the form of fibers, bristles, ribbons, or the like.

It is sometimes advantageous to add to the plasticizing bath a wetting agent, swelling agent, or a penetrating agent to accelerate the process. The compositions obtained by the process of this invention may also contain other types of modifying agents, e. g. luster modifying materials, pigments, dyes, antioxidants, oils, antiseptics, cellulose derivatives, etc.

As indicated in the examples, the effect of the plasticizing agent in the final product is increased by the presence of a small amount of water. Other hydroxylated nonsolvents, particularly alcohols such as methanol, propanol, isobutanol, benzyl alcohol, cyclohexanol, hexamethylene glycol, and glycerol have a similar effect.

Through the process of this invention the water absorption of the polyamides is markedly decreased. Thus polyhexamethylene adipamide plasticized as in Example IV with 4-tertiary amylphenol absorbs only 1.6% by weight of moisture at 50% relative humidity as compared to 2.6% for the unplasticized polymer. At saturation this polyamide absorbs only 5.2% of its weight of water as compared to 7.6% for the unmodified polymer. Polyhexamethylene adipamide plasticized with 4% by weight of aluminum stearate absorbs at 50% humidity only 1.8% of its weight of moisture and at saturation only 5.1%. Stearic acid and abietic acids are also effective in lowering the moisture absorption of the polyamides.

The process of this invention is useful in many forms and for many purposes. Typical applications include the plasticization of yarns, fabrics, bristles, surgical sutures, fish line leaders, fish lines, dental floss, rods, tubes, films, ribbons, sheets, safety glass interlayers, molded articles and electrical insulation (e. g., for wires). This process is particularly advantageous and useful for incorporating plasticizers which decompose or react with the polyamides at elevated temperatures. This is especially true in the case of polyamides having limited solubility and high melting points where decomposition occurs when an attempt is made to incorporate modifying agents such as acids by direct fusion. In such cases, up to 20% of the acid may be introduced by immersing the polyamide in a solution or suspension of the modifying agent in a nonsolvent for the polyamide. A further advantage which the process has over other methods of plasticization is that certain plasticizers which tend to produce haziness in the polyamide when incorporated by melt blending or solvent blending can be introduced into clear, transparent films of the polyamides without impairing this transparency.

As many apparently widely different embodiments of this invention may be made without departing from the spirit and scope thereof, it is to be understood that I do not limit myself to the specific embodiments thereof except as defined in the appended claims.

I claim:

1. A process for plasticizing synthetic linear polyamide by selective absorption which comprises immersing the said polyamide, in the solid state, in a solution of a plasticizer in a liquid medium which exerts substantially no solvent action on the said polyamide, and continuing the said immersion until the ratio of said plasticizer to said liquid medium within the immersed polyamide exceeds the ratio of said plasticizer to said liquid medium in said solution; the said polyamide being one derived from a polyamide-forming composition comprising reacting material selected from the class consisting of polymerizable monoaminomonocarboxylic acids and mixtures of diamine and dibasic carboxylic acid, and the said plasticizer being selected from the class of plasticizers consisting of carboxylic acids, phenols, and sulfonamides, and having a boiling point above 200° C.

2. The process set forth in claim 1 in which the said polyamide comprises the reaction product of a diamine and a dibasic carboxylic acid.

3. The process set forth in claim 1 in which the said polyamide is a monoaminomonocarboxylic acid polymer.

4. The process set forth in claim 1 in which the said plasticizer is a carboxylic acid and has a boiling point above 200° C.

5. The process set forth in claim 1 in which the said plasticizer is a phenol and has a boiling point above 200° C.

6. The process set forth in claim 1 in which the said plasticizer is a sulfonamide and has a boiling point above 200° C.

7. The process set forth in claim 1 wherein the said polyamide is in pellicular form.

8. A process for plasticizing solid synthetic linear polyamide by selective absorption which comprises immersing the said solid polyamide in a substantially saturated aqueous alcohol solution of a plasticizer wherein the ratio of plasticizer to aqueous alcohol is not in excess of 1:19, the said aqueous alcohol being a non-solvent for the said polyamide, and continuing the said immersion until the ratio of plasticizer to the said aqueous alcohol within the immersed polyamide exceeds the ratio of plasticizer to the said aqueous alcohol in the said solution; the said polyamide being one derived from a polyamide-forming composition comprising reacting material selected from the class consisting of polymerizable monoaminomonocarboxylic acids and mixtures of diamine and dibasic carboxylic acid, and the said plasticizer being selected from the class of plasticizers consisting of carboxylic acids, phenols, and sulfonamides, and having a boiling point above 200° C.

9. The process set forth in claim 8 wherein the said polyamide is polyhexamethylene adipamide.

COLE COOLIDGE.